United States Patent [19]

Hart

[11] Patent Number: 5,144,416

[45] Date of Patent: Sep. 1, 1992

[54] VIDEO DISPLAY AND IMAGING DEVICES HAVING LIQUID CRYSTAL SCANNING

[76] Inventor: Eastman Hart, 1655 Pickering Parkway, Apt. 102, Pickering, Ontario, Canada, L1V 6L3

[21] Appl. No.: 594,945

[22] Filed: Oct. 10, 1990

[51] Int. Cl.$^5$ .......................... H04N 3/14; H04N 9/30
[52] U.S. Cl. ...................................... 358/56; 358/901; 358/209; 358/230; 358/55
[58] Field of Search .................. 358/56, 60, 230, 231, 358/236, 241, 901, 55; 340/795

[56] References Cited

U.S. PATENT DOCUMENTS

| | | | |
|---|---|---|---|
| 3,473,872 | 10/1969 | Okamura | 358/209 X |
| 3,700,802 | 10/1972 | Marklin et al. | 340/795 X |
| 4,085,420 | 4/1978 | Stuckenbrock | 358/901 X |
| 4,090,104 | 5/1978 | Vann et al. | 358/901 X |
| 4,280,125 | 7/1981 | Kazan | 340/795 |
| 4,578,709 | 3/1986 | Lang et al. | 358/230 |
| 4,601,537 | 7/1986 | Saccocio | 358/225 X |
| 4,603,356 | 7/1986 | Bates | 358/225 |
| 4,640,592 | 2/1987 | Nishimura et al. | 358/901 X |
| 4,701,789 | 10/1987 | Bonye | 358/65 |
| 4,762,391 | 8/1988 | Margolin | 358/901 X |
| 4,833,540 | 5/1989 | Kokubu | 358/228 X |
| 4,978,952 | 12/1990 | Irwin | 340/795 |
| 5,009,483 | 4/1991 | Rockwell | 358/901 X |
| 5,018,007 | 5/1991 | Lang et al. | 358/60 |

*Primary Examiner*—James J. Groody
*Assistant Examiner*—Mark R. Powell
*Attorney, Agent, or Firm*—Ridout & Maybee

[57] ABSTRACT

A vacuum tube video display screen and imaging device utilizing waveguides to disperse a horizontal line of image over the vertical area of the viewing screen and an array of closely spaced liquid crystal lines to permit passage of light from the dispersed image through to a phosphor coating. By deactivating lines of liquid crystal in a sequence corresponding to the sequence of image lines scanned along the optical waveguides a complete picture is formed on the viewing screen. In a further embodiment an optical waveguide sheet disperses a single pixel of image over the entire viewing screen, and orthogonal arrays of closely spaced liquid crystal lines are sequentially activated to permit passage of light to the corresponding pixel on the viewing screen. An imaging device utilizes orthogonal arrays of closely spaced liquid crystal lines extending across the image plane to permit passage of a single pixel of light to a photoemissive material co-operating with an anode, which produces an electronic signal corresponding to the intensity of light in each pixel.

15 Claims, 6 Drawing Sheets

VIDEO DISPLAY AND IMAGING DEVICES HAVING LIQUID CRYSTAL SCANNING

FIELD OF THE INVENTION

This invention relates to a video display screen and system. In particular, this invention relates to a vacuum tube video display screen providing means for producing an image from an electron beam or other light source requiring a cabinet of relatively little depth, and a video imaging device.

BACKGROUND OF THE INVENTION

A conventional television tube comprises a cathode ray tube of generally conical configuration. An electron gun disposed in the smaller end of the cone scans a series of horizontal lines along a phosphor film coating the viewing surface of the picture tube, exciting the phosphor and causing it to phosphoresce along each horizontal line to a degree corresponding to the intensity of the electron beam, which varies according to the video signal input.

In a typical video display the electron beam scans from left to right along the viewing screen, beginning at the top, and resets to the left-hand side of the screen for scanning successively lower horizontal lines until the entire viewing screen has been scanned. Current television video signal standards call for scanning of alternate lines in succession, to produce two fields of interlaced scanning per frame of 525 horizontal lines, at a rate of approximately 30 frames per second.

The primary disadvantage in such a video display device is the depth required to enable the electron beam to scan the viewing screen both horizontally and vertically, due to the need for each pixel on the viewing screen to be directly addressed by the electron beam and limitations on the degree to which the electron beam can be deflected. Distortion occurs along the edges of the viewing screen due to the angle of the electron beam as it approaches the outer limits of its arc. This has made the production of so-called "flat-screen" television receivers difficult.

The present invention overcomes these disadvantages by providing a thin panel video display device, in one embodiment utilizing waveguides to provide variation on the viewing screen in a single direction, for example horizontally. Each pixel is dispersed over the entire vertical length of the viewing screen, and a series of closely spaced horizontal liquid crystal lines provides vertical variation by suppressing the passage of light to the phosphor layer along all but a single horizontal line corresponding to the line scanned by the electron beam. By scanning the waveguides in sequence, and sequentially deactivating liquid crystal lines each for the duration of a single scanning cycle, both horizontal and vertical variation of the signal can be achieved even though the energy beam scans unidirectionally.

In a further embodiment a waveguide is utilized to disperse a single pixel of the video input signal over the entire area of the viewing screen, and a pair of orthogonally oriented arrays of liquid crystal lines provide horizontal and vertical variation on the viewing screen through sequential deactivation which permits the passage of light to a single pixel on the viewing screen. An imaging device utilizing this embodiment converts an image to an electrical signal which is stored in a suitable medium.

SUMMARY OF THE INVENTION

The present invention thus provides a vacuum tube video display device having a series of isolated aligned waveguide fibres, each having a receiving end and an emitting face, a phosphorescent layer spaced from the emitting faces of the waveguide fibres, an energy source for sequentially injecting energy into the receiving ends of the fibres, a carrier containing closely spaced lines of liquid crystal oriented orthogonally to the fibres, interposed between the emitting faces and the phosphorescent layer, and control means for momentarily deactivating a line of liquid crystal during a scanning cycle to permit passage of energy through to the phosphorescent layer, the control means deactivating lines of liquid crystal in a sequence corresponding to the sequence of image lines scanned by the energy source.

The present invention further provides a vacuum tube video display device having a waveguide sheet coupled to an energy source responsive to a video input signal, having an emitting face, a phosphorescent layer spaced from the emitting face, a liquid crystal matrix comprising a first array of closely spaced liquid crystal lines oriented orthogonally to a second array of closely spaced parallel liquid crystal lines, interposed between the emitting face and the phosphorescent layer, and control means for sequentially deactivating the lines of liquid crystal in the first array for the duration of a cycle of sequential deactivation of the liquid crystal lines in the second array in synchronization with each pixel of image emitted from the emitting face.

The present invention further provides a video imaging device comprising an optical lens for focusing an image on a plane, a liquid crystal matrix comprising a first array of closely spaced liquid crystal lines oriented orthogonally to a second array of closely spaced parallel liquid crystal lines, extending across the image plane, photoemissive means co-operating with an anode for converting light passing through the liquid crystal matrix into an electronic signal corresponding to the intensity of the image at each successive matrix cell, and control means for sequentially deactivating the lines of liquid crystal in the first array for the duration of a cycle of sequential deactivation of the liquid crystal lines in the second array.

BRIEF DESCRIPTION OF THE DRAWINGS

In drawings which illustrate by way of example only a preferred embodiment of the invention.

DETAILED DESCRIPTION OF THE INVENTION

Figure 1:
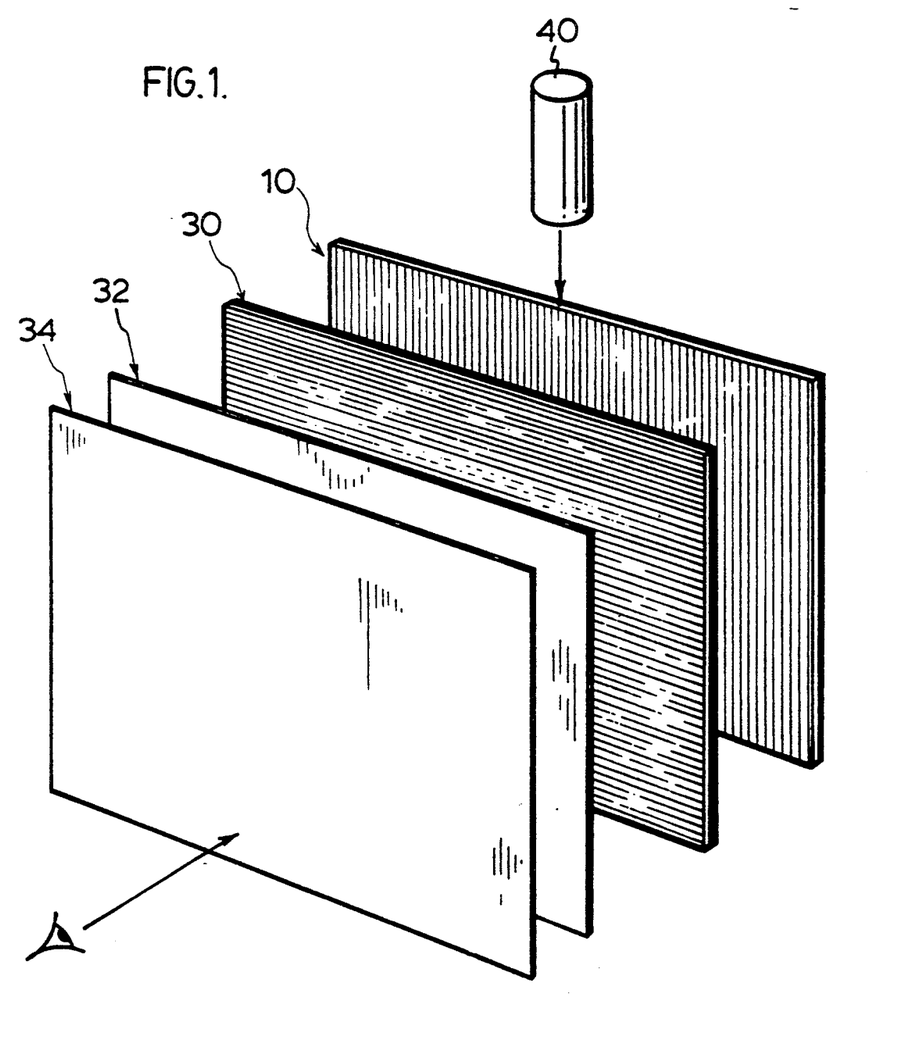
FIG. 1 is an exploded perspective view of a display device according to the present invention.

In a first preferred embodiment of the invention, as illustrated in FIG. 1, the display device comprises a waveguide array 10, a layer of closely spaced liquid crystal lines 30, a phosphorescent layer 32, a layer of protective glass 34 and an electron gun 40 encased in a vacuum-sealed envelope (not shown). The envelope may be a glass tube, or may be formed in part by the waveguide array 10 itself.

Figure 2:
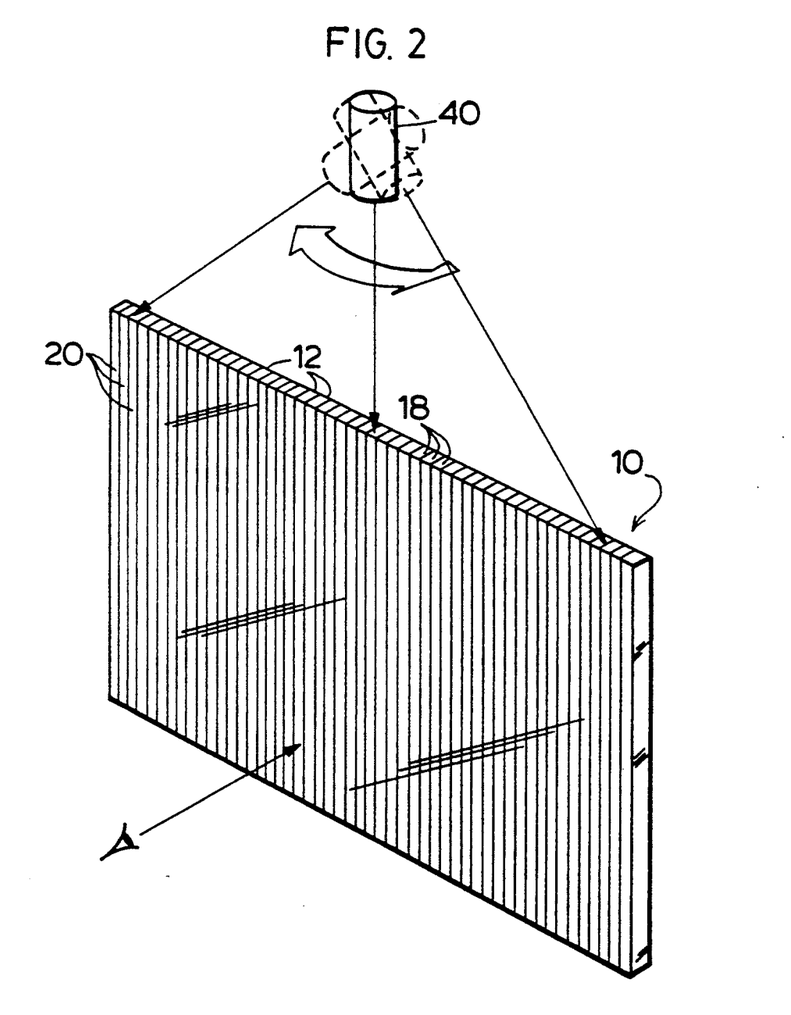
FIG. 2 is a perspective view of a waveguide array illustrated in FIG. 1.
Figures 3, 7:
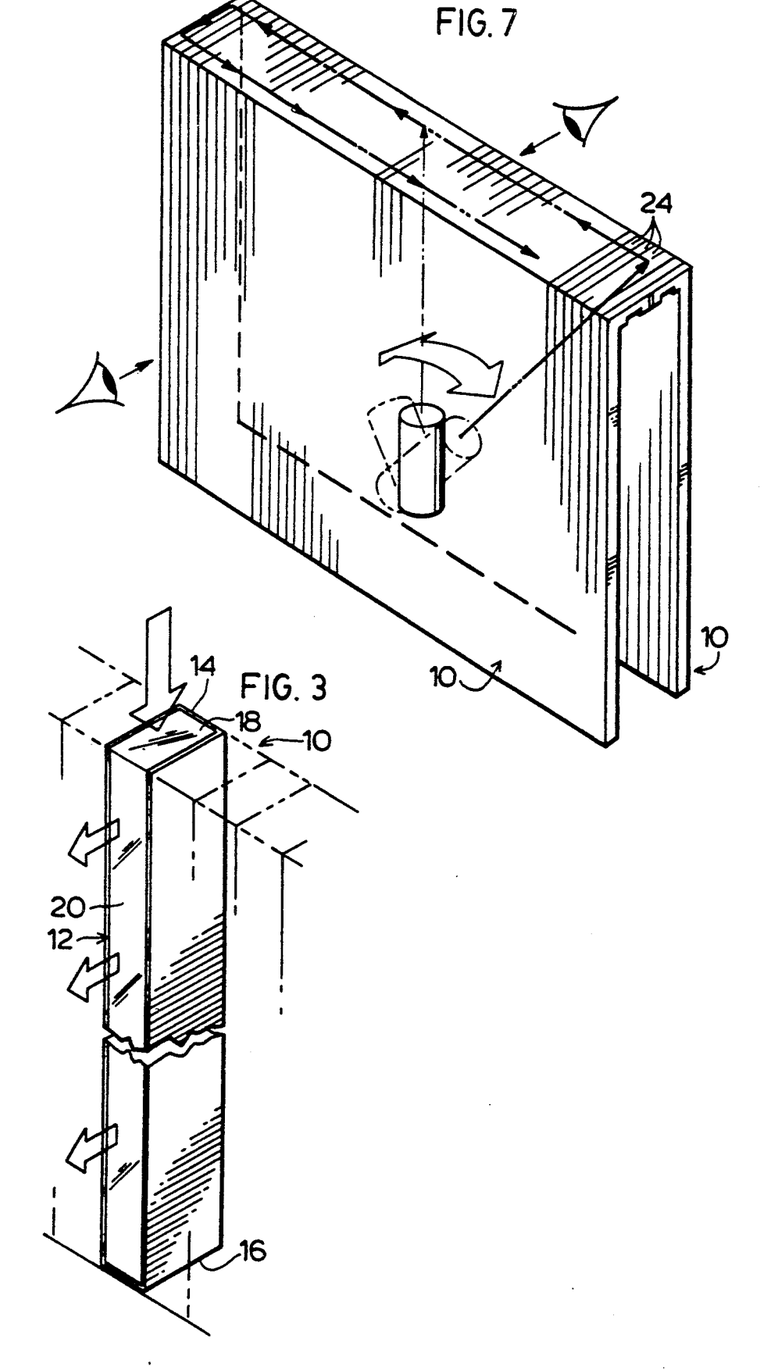
FIG. 3 is a partial perspective view of a waveguide fibre illustrated in FIG. 2.
FIG. 7 is a perspective view of the embodiment illustrated in FIG. 5.

The waveguide array 10, illustrated in FIG. 2, comprises a series of waveguide fibres or slabs 12 laminated or bound together. The waveguide fibres 12 are preferably rectangular in cross-section, although fibres of any cross-sectional shape may be used. Each waveguide fibre 12 is isolated by an insulating coating 14 over its side and rear faces, as shown in FIG. 3, and preferably includes a reflecting end 16 coated with a reflective material opposite to the receiving end 18. Thus, energy injected into the receiving end 18 is dispersed and emitted along only the front face 20 of the waveguide fibre 12 with more or less uniform intensity along the emitting face 20 of the fibre 12, corresponding to the intensity of light or electron energy injected.

The waveguide array 10, preferably comprising between 2,000 and 5,000 identical waveguide fibres 12, thus defines the size of the viewing screen. The fibres 12 may be of any suitable length, defining the vertical dimension of the viewing screen. The number and breadth of the fibres 12 defines the horizontal dimension of the viewing screen. The emitting faces 20 of the fibres 12, collectively forming the emitting face of the waveguide array 10, should be in closest possible alignment, preferably in planar alignment although lateral curvature of the waveguide array 10 is also possible if the track scanned by the energy source 40 is adapted accordingly.

Figures 4, 5:
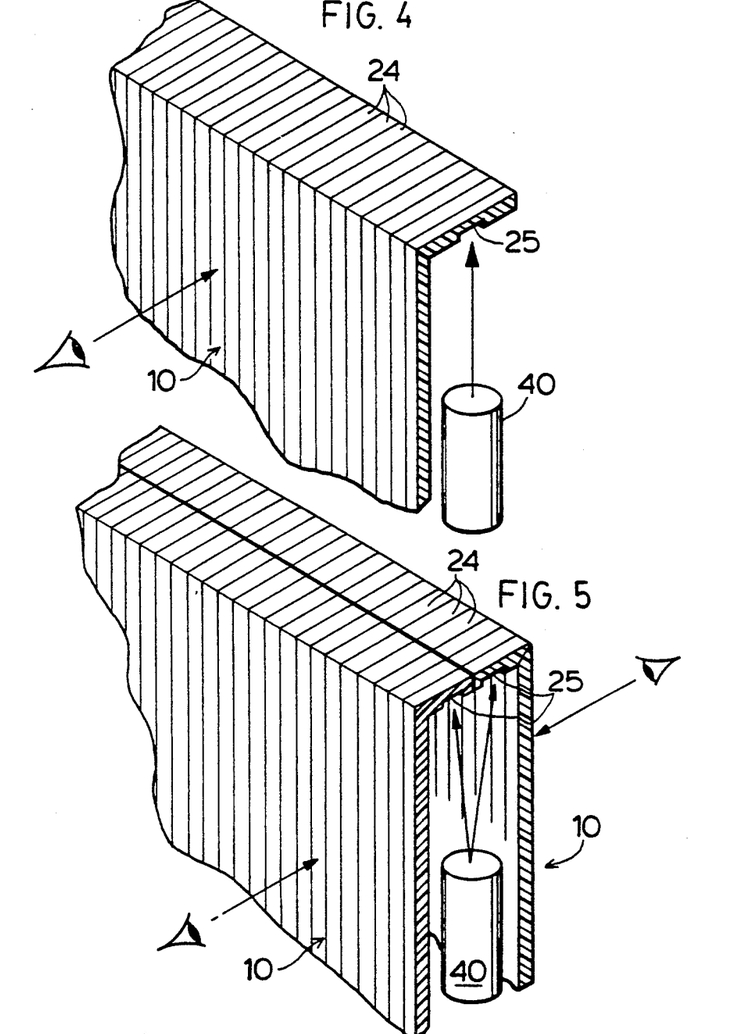
FIG. 4 is a partial sectional perspective view of the waveguide array illustrated in FIG. 2 coupled to intermediary waveguides.
FIG. 5 is partial sectional perspective view of a further embodiment of the invention having opposed viewing screens.
Figure 6:
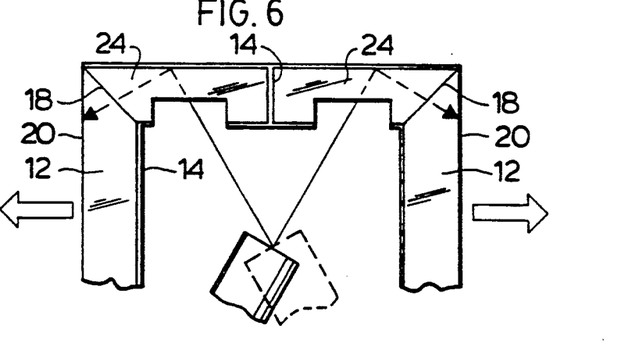
FIG. 6 is a cross-sectional view of the embodiment illustrated in FIG. 5.

An energy source 40 such as a laser is coupled to the waveguide fibres 12. The energy source 40 may be positioned so as to scan a track along the receiving ends 18 of the waveguide fibres 12 in the waveguide array 10, illustrated in a simple configuration in FIG. 2, or, as illustrated in FIG. 4, insulated intermediary waveguides 24 coupled to the receiving ends 18 may be positioned to guide the energy beam into the fibres 12 from any convenient direction. The intermediary waveguides 24 are each provided with a transparent section, shown as a channel 25, to permit entry of the energy beam. The path of the energy beam is illustrated notionally in FIG. 6 showing an embodiment of the invention described below.

The energy source may be a laser, or any other directed light source, and the waveguide characteristics of the waveguide fibres 12 should be selected accordingly. Similarly, the energy source may be an electron gun, and the characteristics of the waveguides must be suitable for guiding an electron beam. The electron gun is more consistent with current television receiving systems although unless otherwise indicated the term "energy source" is used in this specification for both "light source" and "electron gun" and both energy sources are contemplated in the preferred embodiments of this invention. The embodiments described below will be described with reference to a laser energy source, and the waveguides are accordingly optical waveguides. The analogy using electron beam waveguides will be obvious to those skilled in the art.

A phosphorescent layer 32, applied to a transparent carrier such as a sheet of glass 34, is spaced from the light emitting face of the optical waveguide array 10. Light emitted from the light emitting face of the optical waveguide array 10 excites the phosphorescent layer 32 and causes it to phosphoresce, thus "capturing" the pattern of light emitted. The phosphorescent material selected should have a recovery time sufficient to allow it to continually phosphoresce throughout a complete frame cycle, as described below, as is commonly known in prior art vacuum tube display devices.

Variation of the intensity of the laser beam as it scans the light receiving end 18 of each optical fibre 12 results in variation of the light emitted across the light emitting face of the optical waveguide array 10. In the embodiment illustrated, the optical fibres 12 are oriented vertically and accordingly horizontal variation is produced across the light emitting face. In effect, a single horizontal line of image is dispersed over the entire vertical length of the light emitting face of the optical waveguide array 10.

Vertical variation is provided by a transparent carrier, such as a thin plastic film 30, containing a series of closely spaced horizontal liquid crystal lines which are normally activated, and thus opaque. Control circuitry of known design, synchronized to the scanning cycle of the electron gun, deactivates a single horizontal liquid crystal line corresponding to the image line being scanned.

The control circuit deactivates a single liquid crystal line as the laser 40 begins to scan a line along the optical waveguide array 10. The control circuit reactivates the line of liquid crystal, restoring it to the opaque state, once the laser beam has reached the end of the optical waveguide array 10, and then deactivates the next liquid crystal line in sequence as the laser 40 resets and again begins scanning the optical waveguide array 10. In this fashion, each line scanned by the laser 40 is dispersed and emitted along the entire vertical length of the optical waveguide array, but is permitted to pass through the liquid crystal barrier 30 only along a single horizontal line, corresponding to the image line being scanned, and therefore excites the phosphorescent layer 32 only along that single horizontal line. The successive momentary deactivation of liquid crystal lines thus provides vertical variation in the image produced on the viewing screen.

It will be noted that in the example described horizontal variation is provided by the varying intensity of the laser beam as it strikes the optically isolated optical fibres 12, as dictated by the video input signal, and vertical variation is provided by selective sequential deactivation of liquid crystal lines. However, if the video input signal were so designed it would be equally available to arrange the optical fibres 12 to extend horizontally and the liquid crystal lines to extend vertically. Bidirectional variation is achieved so long as the liquid crystal lines extend orthogonally to the light emitting faces 20 of the optical fibres 12. It will be apparent that any number of liquid crystal lines can be employed, depending upon the characteristics of the video input signal.

In operation, using current television signal standards as an example, as the laser 40 begins to scan the first line of a frame from left to right along the light receiving ends 18 of optical fibres 12 in the optical waveguide array 10, the first (uppermost) line of liquid crystal is deactivated allowing light emitted from the light emitting face of the optical waveguide array 10 to pass through and strike the phosphorescent coating 32, which captures the first line of image. The laser beam then blanks out and the first line of liquid crystal is reactivated and becomes opaque. The laser 40 resets to the left-hand side of the optical waveguide array and begins scanning the third line of the image frame as the third line of liquid crystal is deactivated, etc. This process continues for 525 lines to produce two fields of interlaced scanning per frame, at a rate of 30 frames per second. Operating in this fashion the present invention can be adapted to current television signal standards with little or no modification.

A translucent photoemissive layer may be interposed between the layer of liquid crystal lines 30 and the phosphorescent layer 32. The photoemissive layer emits electrons in direct proportion to the intensity of light emitted from the light emitting face of the optical waveguide array 10 and passing through the layer of liquid crystal lines 30, and can thus enhance the image produced on the phosphorescent layer 32 and compensate for any non-uniformity in the intensity of light emitted along the light emitting face 20 of an optical fibre 12. Enhanced contrast in the produced image can be achieved by utilizing a photoemissive material having an emission threshold, such that unless light passing through the layer of liquid crystal lines 30 exceeds this threshold the phosphorescent layer 32 remains dark.

In a further embodiment of the invention, illustrated in FIGS. 5 to 7, the display device may be provided with two viewing screens, one on each side of the light source 40. In this embodiment, after the laser 40 scans a track along intermediary waveguides coupled to the optical waveguide array 10 of the first viewing screen, rather than resetting to the left side of the screen the laser beam is redirected to scan a track along intermediary waveguides coupled to the light receiving ends 18 of optical fibres 12 in the optical waveguide array 10 of the second viewing screen, along which the laser 40 scans the same image line. Upon completion, the laser 40 is redirected to the first track to scan the next sequential image line, and so on. The laser 40 thus scans from left to right along both tracks, producing a laterally correct image on both viewing screens. In the embodiment shown intermediary waveguides 24 for each viewing screen are isolated by an insulating barrier 14. The control circuitry for sequentially deactivating the liquid crystal lines (not shown) is modified in known fashion to accommodate the two viewing screens.

Figure 8:
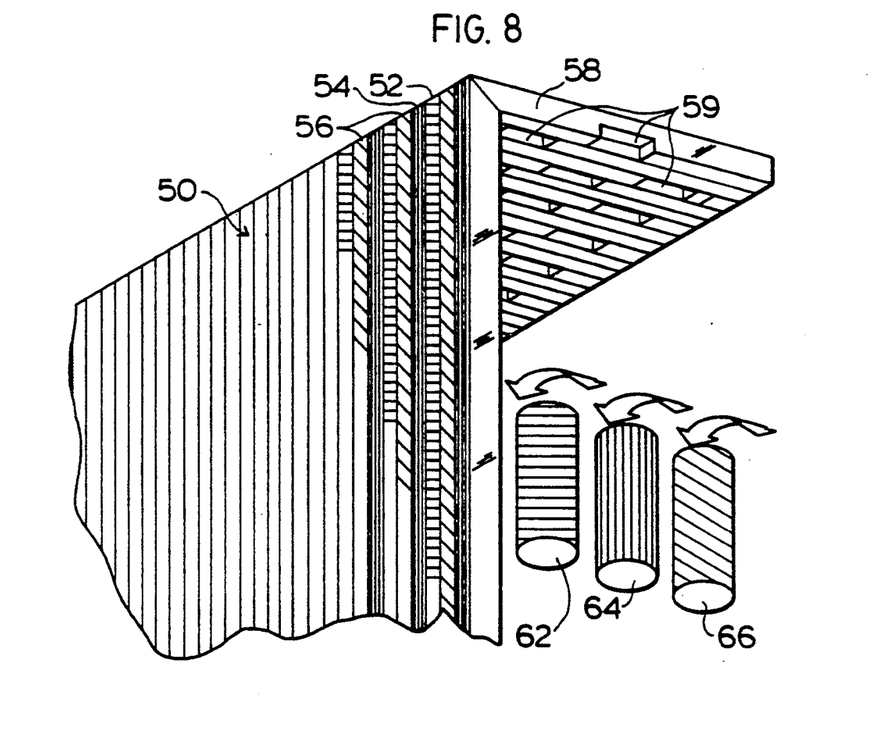
FIG. 8 is a partial perspective view of a still further embodiment of the invention for a colour display device.

The introduction of colour can be accomplished in two ways. As illustrated in FIG. 8, red, blue and green optical fibres 52, 54, 56, optically isolated from each other to prevent interference, may be laminated together in successive bundles or triplets across the optical waveguide array 50. Each colour has an associated light source 62, 64, 66 and an associated scanning track formed by transparent sections of the intermediary waveguides shown as channels 59. For example, an intermediary waveguide 58 associated with each red optical fibre 52 may be provided with a transparent section 59 at its rear portion while the rear portion of intermediary waveguides 58 associated with each green and blue optical fibre remain coated and thus opaque. A laser 62 scanning a track along the rear portion of the intermediary waveguides 58 will illuminate only the red optical fibres 52. Likewise, middle and front portions of the intermediate waveguides 58 may be provided with transparent sections 59 for green optical fibres 54 and blue optical fibres 56, respectively, and each associated laser 64, 66 scans a track along the channels 59 associated with the colour intended to be produced on the viewing screen.

Successive optical fibres intended to produce red, green and blue, respectively, may be coloured or filtered accordingly, or may be uncoloured optical fibres overlaid by red, blue and green phosphorescent vertical strips in the phosphorescent layer (not shown).

In the embodiments described above the transparent sections forming the track scanned by the laser 40, i.e. the light receiving ends 18 of the optical fibres 12 or channels 25 in the intermediary waveguides 24, as the case may be, may be provided with a phosphorescent coating so that the laser beam is dispersed over a larger area of the transparent section and can thus produce more light within each optical fibre 12. Clarity of the resulting image is not sacrificed, since it is entirely dependent upon the breadth of the light emitting faces 20 of the optical fibres and the width of the liquid crystal lines.

Figure 9:
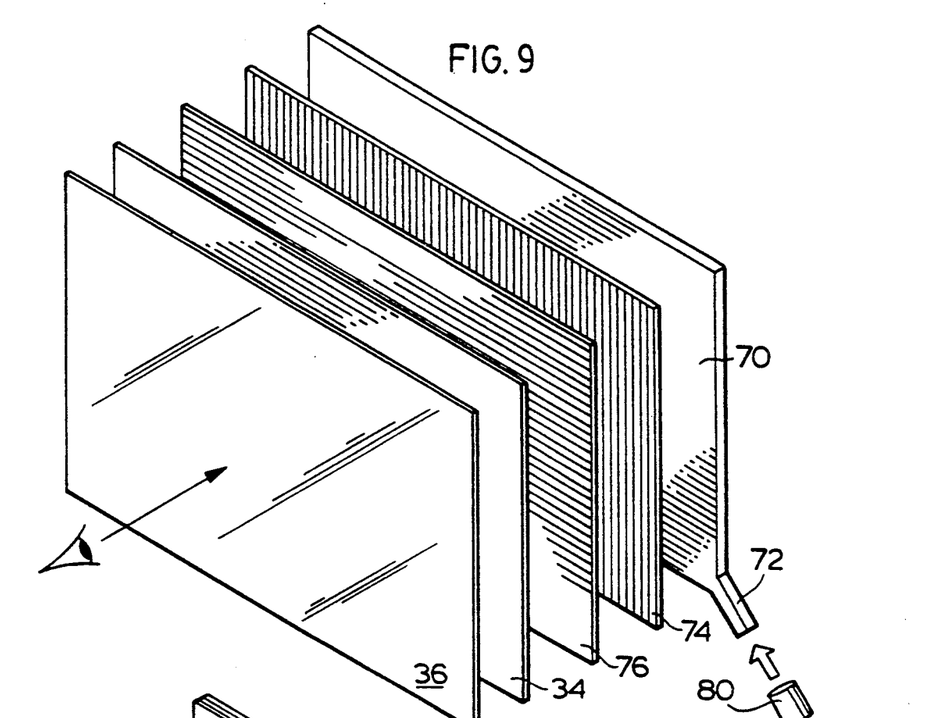
FIG. 9 is an exploded view of a still further embodiment of the invention.

In a further embodiment of the present invention, illustrated in FIG. 9, a completely solid-state version of the display screen utilizes an optical waveguide 70 comprising a thin sheet of plastic or other suitable waveguide material coated on one face and all edges with a reflective material. High intensity laser light responsive to the video input signal is optically coupled to the waveguide sheet 70, being injected into a portion of the edge of the waveguide, as at 72, either directly or through an intermediary waveguide. Introduced between the waveguide sheet 70 and the phosphorescent coating 34 are films 74, 76 each containing a series of closely spaced liquid crystal lines, oriented orthogonally to one another to form a matrix. Horizontal variation across the viewing screen is provided by successive deactivation of vertical liquid crystal lines in layer 74, while vertical variation is provided by successive deactivation of horizontal liquid crystal lines in layer 76.

Figures 10, 10A:
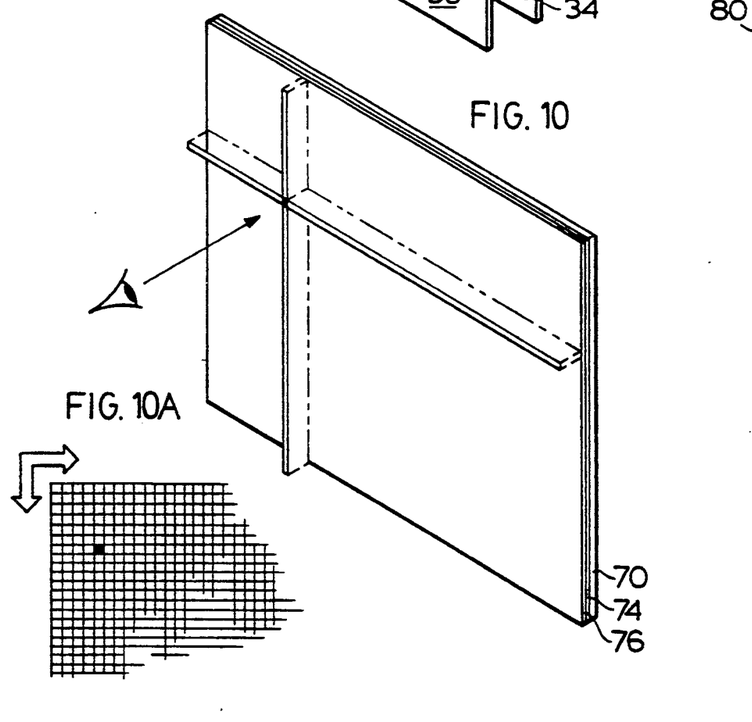
FIG. 10 is a diagrammatic representation of a point in the sequencing of the liquid crystal matrix illustrated in FIG. 9.
FIG. 10A is a graphic representation of the pixel illuminated by deactivation of the liquid crystal lines shown in FIG. 10.

For example, a single horizontal liquid crystal line is deactivated and remains transparent as the entire sequence of vertical liquid crystal lines are momentarily deactivated sequentially from left to right, permitting only a single pixel to be captured by the phosphorescent coating with the deactivation of each vertical liquid crystal line, as illustrated in FIGS. 10 and 10a. Once the entire series of vertical lines has been deactivated, the horizontal liquid crystal line is reactivated and the next sequential horizontal liquid crystal line is deactivated as the process repeats. The need for scanning by the light source 80 has been completely eliminated in this embodiment, variation across the viewing screen instead being provided by the layer of vertical liquid crystal lines 76.

In this embodiment, a high intensity laser or light emitting diode is likely to be more effective than an electron gun, since each image pixel is dispersed over the entire area of the waveguide sheet 70 and thus the intensity of light available to pass through to the phosphorescent layer is many orders of magnitude lower than the intensity of the light source itself. As in the previously described embodiment, a photoconductive layer (not shown) may be introduced between the liquid crystal matrix (formed by the combination of layers 74 and 76) and the phosphorescent coating, to enhance the image produced on the viewing screen.

In this embodiment, colour may be introduced by the use of three optical waveguide sheets 70, each with its own respective source of red, green or blue light. Alternatively, the waveguides 70 may be coloured or laminated with red, green and blue filters, respectively.

Figure 11:
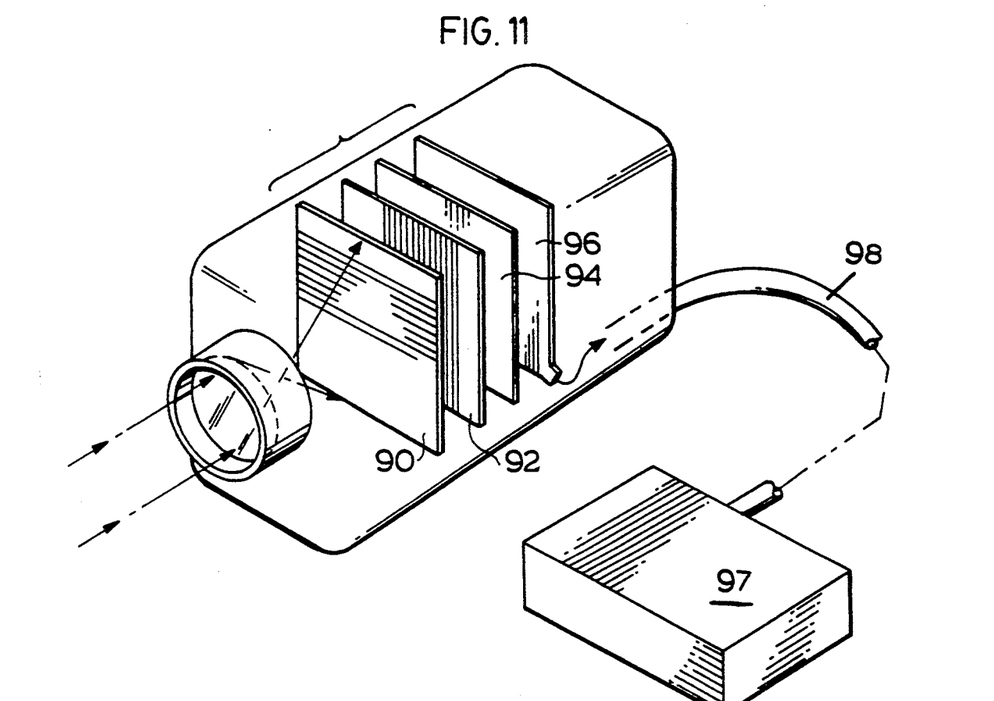
FIG. 11 is a partially exploded view of an imaging device according to the present invention.

In an imaging device embodying the present invention, illustrated in FIG. 11, an image is focused on the matrix of liquid crystal lines, formed by layers of horizontal and vertical liquid crystal lines 90, 92 which are sequentially deactivated in the manner described above. A photoemissive layer 94 emits electrons corresponding to the intensity of the image at each cell of the matrix, which electrons are sequentially received at the high voltage anode 96 and converted into an electronic signal transmitted by a cable 98 to a storage device 97 to be stored in known fashion on a suitable medium such as magnetic videotape. Thus, the photoemissive layer 94 co-operates with the anode 96 to produce an electronic signal of an intensity corresponding to the intensity of the image striking the sole transparent pixel on the image plane, through the entire sequence of pixels in the matrix, storing a single frame on the storage medium.

It can be seen that the resolution of the image produced on the viewing screen is determined by the number of horizontal and vertical lines, the "matrix density", of the optical waveguide and liquid crystal arrays utilized, which determines the number of pixels on the viewing screen. The primary limitation is the video input signal. It will further be seen that the viewing screen in the display device of the present invention may be made completely flat with minimal distortion at the edges.

Phosphor burn, a problem commonly associated with conventional television picture tubes which utilize a single concentrated beam, can be avoided in the display device of the present invention. The energy beam never directly contacts the phosphorescent layer, but is first dispersed over the light emitting area of an optical waveguide and filtered by at least one layer of liquid crystal lines before striking the phosphorescent layer.

Preferred embodiments of the invention having been described herein, it will be obvious to those skilled in the art that variations and modifications of the invention may be made to adapt it for specific applications. This invention includes all such variations and modifications as are within the scope of the appended claims.

I claim:

1. A device for filtering light and selectively permitting the passage of light from a light source to a light-absorbing medium in a video display device or imaging device, comprising
    a liquid crystal matrix having a first array of closely spaced liquid crystal lines oriented orthogonally to a second array of closely spaced parallel liquid crystal lines, and
    control means for sequentially deactivating the lines of liquid crystal in the first array for the duration of a cycle of sequential deactivation of the liquid crystal lines in the second array.

2. A light filtering device as defined in claim 1 in an imaging device, wherein the light-absorbing medium comprises photoemissive means and an anode converts light passing through the liquid crystal matrix into an electronic signal corresponding to the intensity of the image at each successive matrix cell.

3. A light filtering device as defined in claim 1 in a video display device, wherein the light-absorbing medium comprises a phosphorescent layer.

4. A video display device having
    a series of isolated aligned waveguide fibres, each having a receiving end and an emitting face,
    a phosphorescent layer spaced from the emitting faces of the waveguide fibres,
    an energy source for sequentially injecting energy into the receiving ends of the fibres,
    a carrier containing closely spaced lines of liquid crystal oriented orthogonally to the fibres, interposed between the emitting faces and the phosphorescent layer, and
    control means for momentarily deactivating a line of liquid crystal during a scanning cycle to permit passage of energy through to the phosphorescent layer,
    the control means deactivating lines of liquid crystal in a sequence corresponding to the sequence of image lines scanned by the energy source,
    in which the series of waveguide fibres includes successive triplets of fibres, each fibre in a triplet being adapted to receive energy from a separate energy source corresponding to a red, blue or green colour, whereby each separate energy source scans a separate path and the fibre of each triplet corresponding to that energy source includes a light receiving portion along the path scanned by that energy source while the other fibres in the triplet are opaque along the path scanned by that energy source.

5. A video display device as defined in claim 4 wherein the energy source is a laser.

6. A video display device as defined in claim 4 wherein the receiving ends of the waveguide fibres are provided with a phosphorescent coating, and the energy source is an electron beam.

7. A video display device as defined in claim 4 in which the waveguide fibres are oriented vertically in a waveguide array.

8. A video display device having
    a series of isolated aligned waveguide fibres, each having a receiving end and an emitting face,
    a phosphorescent layer spaced from the emitting faces of the waveguide fibres,
    an energy source for sequentially injecting energy into the receiving ends of the fibres,
    a carrier containing closely spaced lines of liquid crystal oriented orthogonally to the fibres, interposed between the emitting faces and the phosphorescent layer, and
    control means for momentarily deactivating a line of liquid crystal during a scanning cycle to permit passage of energy through to the phosphorescent layer,
    the control means deactivating lines of liquid crystal in a sequence corresponding to the sequence of image lines scanned by the energy source,
    having a pair of opposed series of waveguide fibres, a phosphorescent layer spaced from the emitting faces of each series, a carrier containing closely spaced lines of liquid crystal interposed between the emitting faces and the phosphorescent layers and control means for alternately deactivating lines of liquid crystal in each of the carriers, whereby the energy source alternately injects energy into the receiving ends of the fibres of each waveguide series.

9. A video display device as defined in claim 8 in which the series of waveguide fibres includes successive triplets of fibres, each fibre in a triplet being adapted to receive energy from a separate energy source corresponding to a red, blue or green colour.

10. A video display device having
- a waveguide sheet coupled to an energy source responsive to a video input signal, having an emitting face,
- a phosphorescent layer spaced from the emitting face,
- a liquid crystal matrix comprising a first array of closely spaced liquid crystal lines oriented orthogonally to a second array of closely spaced parallel liquid crystal lines, interposed between the emitting face and the phosphorescent layer, and
- control means for sequentially deactivating the lines of liquid crystal in the first array for the duration of a cycle of sequential deactivation of the liquid crystal lines in the second array in synchronization with each pixel of image emitted from the emitting face.

11. A video display device as defined in claim 10 wherein the energy source is a light source.

12. A video display device as defined in claim 11 wherein the light source is a laser.

13. A video display device as defined in claim 10 wherein the energy source is a light emitting diode.

14. A video display device as defined in claim 10 comprising a set of three optical waveguide sheets, each having its own separate energy source for emitting red, green or blue light, respectively.

15. A video imaging device comprising
- an optical lens for focusing an image on a plane,
- a liquid crystal matrix comprising a first array of closely spaced liquid crystal lines oriented orthogonally to a second array of closely spaced parallel liquid crystal lines, extending across the image plane,
- photoemissive means co-operating with an anode for converting light passing through the liquid crystal matrix into an electronic signal corresponding to the intensity of the image at each successive matrix cell, and
- control means for sequentially deactivating the lines of liquid crystal in the first array for the duration of a cycle of sequential deactivation of the liquid crystal lines in the second array.

* * * * *